United States Patent
Moulon et al.

(10) Patent No.: US 8,944,372 B2
(45) Date of Patent: Feb. 3, 2015

(54) DEVICE FOR DETECTING BREAKAGE OF A PRIMARY PATH IN A FLIGHT CONTROL ACTUATOR

(75) Inventors: Thomas Moulon, Ermont (FR); Raphaël Medina, Ecouen (FR)

(73) Assignee: Goodrich Actuation Systems SAS, Buc (FR)

( * ) Notice: Subject to any disclaimer, the term of this patent is extended or adjusted under 35 U.S.C. 154(b) by 275 days.

(21) Appl. No.: 13/695,279

(22) PCT Filed: Apr. 14, 2011

(86) PCT No.: PCT/EP2011/055890
§ 371 (c)(1),
(2), (4) Date: Jan. 14, 2013

(87) PCT Pub. No.: WO2011/134799
PCT Pub. Date: Nov. 3, 2011

(65) Prior Publication Data
US 2013/0105623 A1    May 2, 2013

(30) Foreign Application Priority Data
Apr. 30, 2010    (FR) ...................................... 10 53366

(51) Int. Cl.
*B64C 13/28*    (2006.01)
*F16H 25/20*    (2006.01)

(52) U.S. Cl.
CPC ................. *B64C 13/28* (2013.01); *F16H 25/20* (2013.01); *F16H 25/205* (2013.01)
USPC ........ 244/99.4; 244/99.2; 244/99.3; 244/99.9

(58) Field of Classification Search
USPC ............................... 244/99.2, 99.3, 99.4, 99.9
See application file for complete search history.

(56) References Cited

U.S. PATENT DOCUMENTS

| | | | |
|---|---|---|---|
| 4,745,815 A * | 5/1988 | Klopfenstein | 74/89.25 |
| 8,224,502 B2 * | 7/2012 | Brueckner et al. | 701/3 |
| 2010/0213311 A1 * | 8/2010 | Flatt et al. | 244/99.4 |
| 2013/0001357 A1 * | 1/2013 | Cyrot | 244/99.4 |

FOREIGN PATENT DOCUMENTS

DE    102007023394 A1    11/2008
WO    WO 2008/112363 A3    9/2008

* cited by examiner

*Primary Examiner* — Isam Alsomiri
*Assistant Examiner* — Justin Benedik
(74) *Attorney, Agent, or Firm* — Blakely, Sokoloff, Taylor & Zafman LLP

(57) ABSTRACT

A device (13) for detecting the breakage of a primary path in a flight control actuator, said actuator having a primary path (1) comprising a rotary hollow screw (2), a secondary path (10) comprising a safety rod (3) that reacts the load passing through the screw (2), said device (13) being characterized in that it comprises a position sensor (15), connected to the screw (2), to measure information representative of the angular position thereof, and a disconnection system (17) able to disconnect the screw (2) position sensor (15) in the event of relative movement of the rod (3) with respect to the screw (2) if there is a break in the primary path (1).

9 Claims, 5 Drawing Sheets

DEVICE FOR DETECTING BREAKAGE OF A PRIMARY PATH IN A FLIGHT CONTROL ACTUATOR

GENERAL TECHNICAL FIELD

The present invention relates to detection of a fault in a flight control actuator.

In particular, but without limitation, it relates to the detection of breakage of a primary load path of an aircraft flight control actuator and load transfer to a secondary load path of said actuator.

PRIOR ART

Conventionally, such actuators comprise two mechanical load paths, one primary, the other secondary, the latter being designed to take over the load when the primary fails, generally as a result of breakage of said primary load path.

The general structure of such an actuator is shown schematically in FIG. 1.

In operation on the primary load path 1, the loads pass through a hollow screw 2, having balls or rollers for example.

This feature allows a load-assuming safety rod 3 to be accommodated inside it (a so-called "fail-safe bar"), grooved at its ends and connected to the screw 2 with some play.

This structure provides continuity in transmitting forces and rotation of the assembly, while avoiding axial separation of the elements of the screw in the event of the screw itself breaking.

The screw 2 is terminated at one of its ends by an attachment member, called the high primary clip 4, whereby it is connected to a structure 5 of the aircraft.

In the event of failure of the primary load path 1, that is in the event of breakage of an element of the primary load path 1, the loads are taken over by the secondary load path 10, and particularly by the safety rod 3 the end whereof is a male shape 7 (for example a sphere) positioned within a female shape of an attachment member 8 of the secondary load path called the high secondary clip 8.

This high secondary clip is itself connected to the aircraft by means of an airplane attachment member 9 different from that used to support the primary load path 1.

Numerous systems are known in the prior art for detecting a break in the primary load path and transferring load to the secondary load path in a flight control actuator.

FR 2858035 describes a detection system configured to detect the relative motion in translation of the free end of the safety rod relative to the high secondary clip.

EP 1557588 discloses a device for detecting load transfer from the primary load path to the secondary load path based on the detection of shear between parts of the high secondary clip.

EP 1972549 discloses a solution including a sensor capable of detecting a transferred load on parts providing the high attachment of the secondary load path, such as mounting screws for attaching the secondary load path or mounting clevises for the secondary load path, and capable of detecting that they have been put under load.

However, the solutions proposed to date have disadvantages, because they require a specific and complex implementation at the high secondary clip of the flight control actuators.

What is more, they require the placement of bulky and heavy detection cables at the high secondary clip. These solutions cause an increase in the mass of the aircraft.

Some solutions also require, due to the positioning of the sensors at the interfaces between parts of the actuator, an increase in the play between the parts of the actuator, which is harmful to the vibrational stability of the assembly. The play between the parts of the actuator is known to those skilled in the art by the term "flutter" and is subject to demanding specifications in an aircraft.

Finally, the solutions proposed to date require heavy electronic processing of the measured signals and their reliability leaves room for improvement.

PRESENTATION OF THE INVENTION

The invention aims to correct the disadvantages of the prior art solutions.

To this end, the invention proposes a device for detecting breakage of a primary load path in a flight control actuator, said actuator having a primary load path comprising a rotary hollow screw, a secondary load path comprising a load-assuming safety rod passing through the screw, said device being characterized in that it includes a position sensor, connected to the screw to measure information representing its angular position, and a disconnection system, capable of disconnecting the screw position sensor in the event of relative motion of the rod with respect to the screw upon a break of the primary load path.

The invention is advantageously complemented by the following features, taken alone or in combination:
- the device includes a calculator configured to compare the information measured by the position sensor and information representing the angular position of the screw measured by a second position sensor independent of the disconnection system;
- the calculator is configured to detect a break in the primary load path when the comparison is greater or less than a predetermined threshold;
- the disconnection system is capable of disconnecting the screw position sensor when the rod exerts a predetermined force on the screw, corresponding to a mechanical load exerted by the rod on the screw upon breakage of the screw or of another element of the primary load path;
- the disconnection system includes a breakable pin;
- the breakable pin has a cross-section calibrated to break at a predetermined load, corresponding to a mechanical load exerted by the rod on the work upon a break of the primary load path;
- the breakable pin is subjected to a predetermined extraction load, allowing extraction of the pin from the screw in the event of breakage of said pin;
- the position sensor is an angular position sensor.

The invention also a flight control actuator including a primary load path comprising a hollow rotary screw, a secondary load path comprising a load-assuming safety rod passing through the screw, the secondary load path being capable of taking over forces exerted on the primary load path in the event of a break of the primary load path, said actuator being characterized in that it includes a device for detecting a break in the primary load path as described above.

The invention has many advantages.

One advantage of the invention is offer a simple and low-cost solution.

Another advantage of the invention is to offer a lightweight solution, negligibly increasing the mass of the aircraft.

Yet another advantage of the invention is to offer a solution having improved reliability.

Still another advantage of the invention is to allow a reduction in the play between the parts of the actuator.

Finally, another advantage of the invention is to allow detection under difficult environmental conditions.

PRESENTATION OF THE FIGURES

Other features and advantages of the invention will appear from the description that follows, which is purely by way of illustration and not limiting, and must be read with reference to the appended drawings wherein.

DETAILED DESCRIPTION

Figure 1:
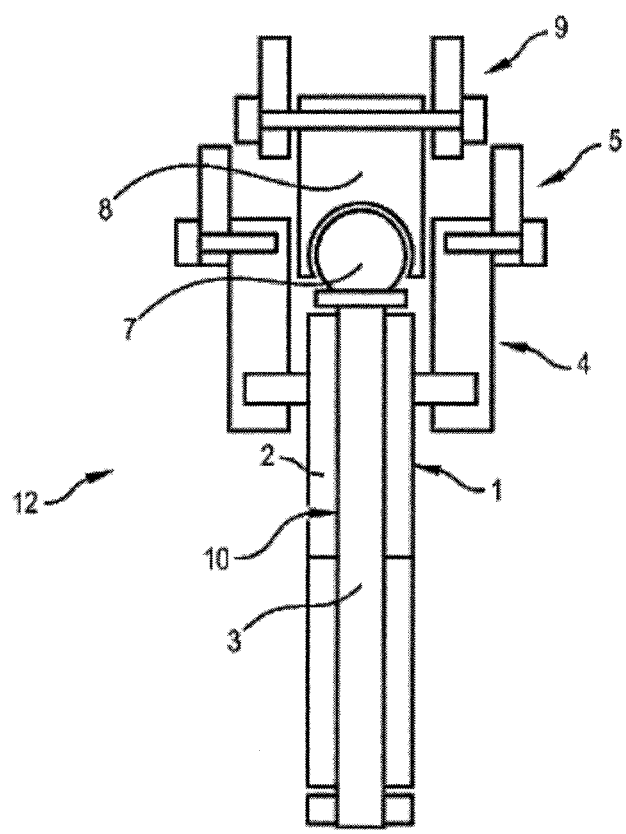
FIG. 1 is a schematic representation illustrating the concept of a flight control actuator.
Figure 2:
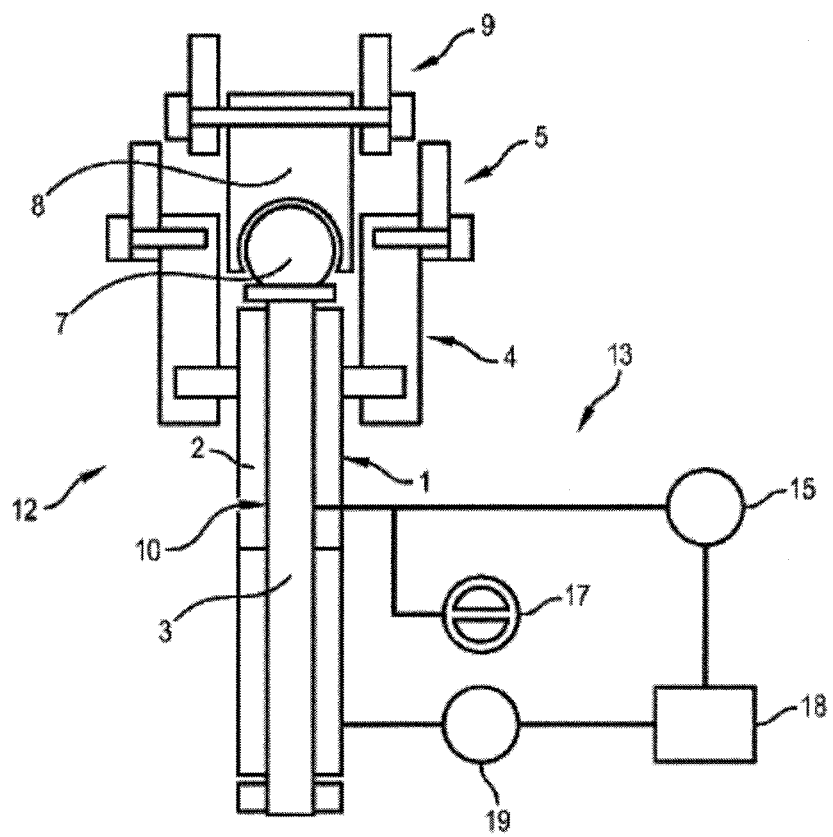
FIG. 2 is a schematic representation of a detection device and of a flight control actuator according to the invention.

Shown in FIG. 2 is a primary load path breakage detection device 13 according to the invention, as well as a flight control actuator 12 according to the invention, equipped with such a device.

The invention relates equally to the detection device, the flight control actuator equipped with such a device and the aircraft including such a flight control actuator.

As stated earlier, the flight control actuator 12 includes a primary load path 1 and a secondary load path 10.

Said actuator 12 is for example a THSA type actuator for controlling a variable horizontal control surface of an aircraft (not shown).

The primary and secondary load paths include numerous elements, and only some of these elements will be described. The structure of flight control actuators comprising a primary and a secondary load path is largely familiar to a person skilled in the art.

The primary load path 1 includes a rotary hollow screw 2 terminating at one of its ends in an attachment member, called the high primary clip 4, through which it is connected to a structure 5 of the aircraft.

Generally, the primary load path 1 also includes a nut (not shown) which cooperates with the screw by being assembled thereto and which is connected to the surface to be controlled.

The screw 2 is controlled in rotation by a motor, which allows the aforementioned nut to be moved in translation, the latter being blocked in rotation for this purpose. Movement in translation of the nut thus enables control of the deflection that it is desired to impart to the variable horizontal surface.

A safety rod 3 passes through the interior of the hollow screw 2. The safety rod is one of the elements of the secondary load path 10.

Generally, said rod 3 is terminated by a spherical head 7 positioned with some play within a female spherical shape of an attachment member 8 of the secondary load path, called the secondary high clip. Said secondary high clip 8 is in its turn connected to the aircraft by means of an aircraft attachment member 9 different from that used to support the primary load path 1.

The attachment of the secondary high clip is known per se, and is accomplished in particular by systems employing attachment clevises and screws.

In "normal" operation, it is the primary load path 1 which carries the loads. In the event of failure of the primary load path 1, particularly by breakage of one of the elements constituting the primary load path 1, such as the high primary clip 4 or the screw 2 for example, it is the secondary load path 10 that takes over the load.

This fault must be detected, in order to inform the pilot and if appropriate to initiate maintenance operations on the ground or possibly in flight.

The primary load path breakage detection device 13 is able to detect such faults.

The primary load path breakage detection device 13 includes a position sensor 15 connected to the screw 2 to measure information representing its angular position.

In one embodiment, the sensor 15 is an angular position sensor 15. In this case, the information representing the angular position of the screw is the angular position itself.

The angular position sensor 15 is configured to measure the angular position of the screw 2 and/or its angular displacement. This may involve angular displacement and/or angular positioning, which can be absolute or relative depending on the conventions selected. Therefore, when the sensor 15 and the screw 2 are connected, the sensor 15 measures the angular position of the screw 2.

The angular position sensor 15 can for example be an active electrical (inductive) rotational displacement measurement sensor of the RVDT (Rotary Variable Differential Transformer) type.

Other angular position sensors can be used.

Alternatively, this may involve a linear position sensor, such as a linear displacement measurement sensor of the LVDT (Linear Variable Differential Transformer) type.

In that case, the linear position sensor 15 is connected to the screw 2 via a ballscrew type mechanism for example, which transforms the rotary motion of the screw 2 into a translatory motion.

The linear position sensor 15 therefore measures a position or displacement that is linear, but represents the angular position of the screw 2.

Any position sensor 15 capable of measuring information representing the angular position of the screw 2 can be used, that is to say that the information measured (a position for example) is correlated to the angular position of the screw 2 and thus allows said angular position to be deduced.

According to the invention, the primary load path breakage detection device 13 includes a disconnection system 17 capable of disconnecting the screw 2 from the position sensor 15 in the event of a relative displacement of the rod 3 with respect to the screw 2 upon a break of the primary load path 1.

Said disconnection therefore brings about the breakage of the connection between the sensor 15 and the screw 2.

The disconnection system 17 is calibrated to disconnect the connection between the screw 2 and the sensor 15 only in the event of a break of the primary load path 1.

Indeed, in the event of breakage of an element of the primary load path 1, it is the secondary load path 10 which takes over the load.

In particular, the rod 3 then undergoes a relative displacement with respect to the screw 2, said displacement being substantially oriented parallel to the screw 2, in a translator motion in one direction or in the other. Said relative displacement of the rod 3 with respect to the screw 2 is detected by the disconnection system 17, which then brings about a cutting of the connection between the screw 2 and the position sensor 15. Said cutting is triggered at the time that the relative displacement of the rod 3 with respect to the screw 2 exceeds a predetermined threshold corresponding to a break of the primary load path 1, said threshold being known from simulation or from in situ measurement. The aim in fact is to avoid spurious detections due to relative motion between the screw 2 and the rod 3 that are not the result of a break of the primary load path 1. Only a relative displacement of the rod 3 with respect to the screw 2 above the threshold corresponds to a break of the primary load path 1.

Below the predetermined threshold, the disconnection system 17 does not cut the connection between the screw 2 and the position sensor 15, which avoids spurious detections.

In certain embodiments, the disconnection system therefore includes a sensor or sensor suite measuring the relative movement of the rod 3 with respect to the screw 2 (or conversely), which makes it possible to disconnect the screw 2 from the position sensor 15 in the event of a break of the primary load path 1.

In other embodiments, the disconnection system 17 is configured to disconnect the position sensor 15 from the screw 2 when the rod 3 exerts a predetermined load on the screw 2, corresponding to a mechanical force exerted by the rod 3 on the screw 2 upon a break of the primary load path 1.

In this case, the relative displacement of the screw 2 with respect to the rod 3 in the event of a break of the primary load path 1 is detected indirectly via the load exerted by the rod 3 on the screw 2.

Indeed, in the event of a break of the primary load path, the rod 3 moves relative to the screw 2 and thereupon exerts a mechanical load on the screw 2 that is greater than a predetermined threshold, said mechanical load being used by the disconnection system 17 to disconnect the screw 2 from the position sensor 15 in the event of a break in the primary load path 1.

The device 13 additionally includes a calculator 18 configured to compare the information representing the angular position of the screw 2 measured by the position sensor 15 and information representing the angular position of the screw 2 measured by a second position sensor 19 of the detection device 13. The information representing the angular position of the screw 2 measured by the second position sensor 19 can be the angular position itself.

The second position sensor 19 differs from the sensor 15 in that it is not connected to the screw 2 via the disconnection system 17. The second position sensor 19 is therefore independent of the disconnection system 17. Besides this difference, it is a sensor of the same type, capable of measuring information representing the angular position of the screw 2. Said sensor can be an angular, linear or other position sensor as described previously for the sensor 15.

This can for example be an angular position sensor belonging to the aircraft itself, used to control and slave the rotation of the screw 2 in "normal" operation.

It can advantageously be in particular an angular position sensor connected with the screw 2 and existing in all flight control actuators, which avoids installing new sensors. This type of sensor is used to control and slave the screw 2 of the primary load path 1.

Advantageously, the position sensor 15 and the second position sensor 19 are incorporated into one and the same multichannel sensor.

The invention therefore allows the use of sensors already present on the aircraft, by simply integrating the detection device 13, and particularly the disconnection system 17, into the actuator.

The calculator 18 can be a dedicated calculator, or more advantageously be a part of the calculator of the aircraft having the actuator 12 on board.

Figure 3:
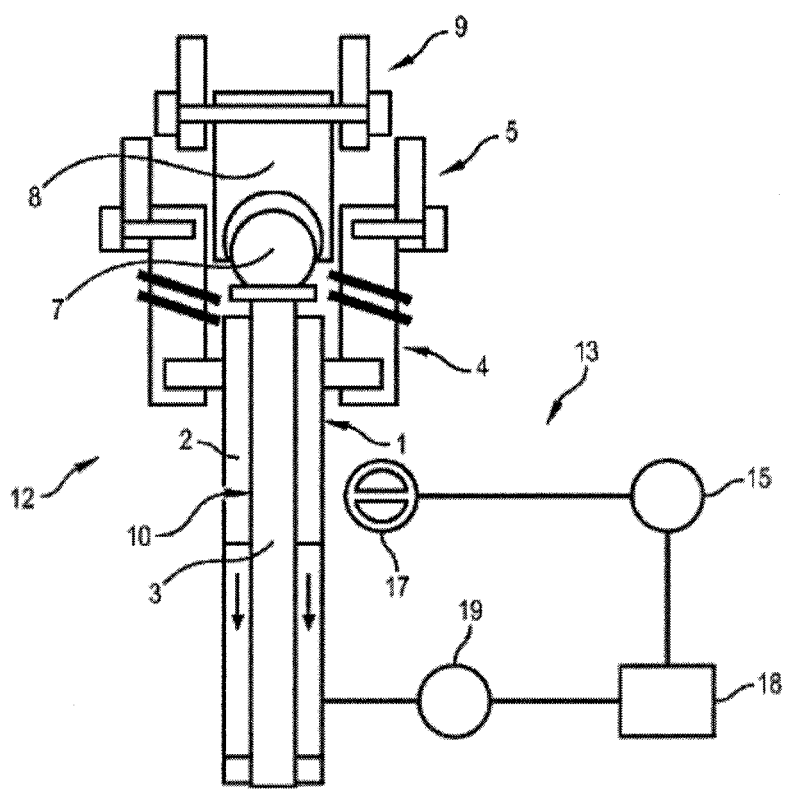
FIG. 3 is a schematic representation of a detection device and of a flight control actuator according to the invention in the event of a break of the primary load path.

Shown in FIG. 3 is a break of the primary load path 1 and a load takeover by the secondary load path 10.

The breakage is illustrated at the location of the primary high clip 4, but may occur on any element participating in the primary load path 1 of the actuator.

Prior to said breakage, that is to say during "normal" operation, the sensor 15 is connected to the screw 2 and therefore measures information representing the angular position of the screw 2.

Furthermore, the screw 2 is controlled in rotation by the pilot via the flight commands that he communicates to the aircraft. Information representing the angular position of the screw 2 is measured by a second position sensor 19 which for its part continues to measure information representing the angular position of the screw 2 even in the event of a break in the primary load path 1, because it is not connected to the screw 2 via the disconnection system 17.

In the event of a break in the primary load path 1, it is the secondary load path 10 which takes over the load. In this case, the rod 3 undergoes a relative displacement with respect to the screw 2, said displacement exceeding a predetermined threshold characteristic of a break of the primary load path 1.

When this displacement exceeding the threshold occurs, the disconnection system 17 brings about cutting of the connection between the screw 2 and the position sensor 15.

Consequently, the sensor 15 no longer measures information representing the angular position of the screw 2.

The position sensor 15 then measures a signal that is zero or constant, which allows detection of the break of the primary load path 1 and hence of the fault.

Advantageously, the fault is detected by comparing the information representing the angular position measured by the position sensor 15 with the information representing the angular position of the screw 2 measured by the second position sensor 19.

Indeed, in the event of a break of the primary load path 1, the second sensor 19 continues to measure information representing the angular position of the screw 2 and the variations in said positioning.

If the calculator 18 compares said signal with the signal measured by the position sensor 15 disconnected from the screw 2 by the disconnection system 17, it is clear that the signals will be different, while prior to the fault these were equal or at least correlated.

Advantageously, the calculator 18 is configured to detect a fault when the comparison between the information measured by the position sensor 15 and the information measured by the second position sensor 19 is greater or less than a predetermined threshold.

The invention sets itself apart from the prior art because it detects a fault directly at the screw 2 and the safety rod 3, and not at the high clip 8 of the secondary load path or the high clip 4 of the primary load path.

Inasmuch as the invention does not require positioning sensors between the parts of the actuator, the play between parts ("flutter") can be reduced, which is very advantageous.

Indeed, it is known to those skilled in the art that "flutter" specifications are very demanding.

Further, the solution proposed is simple and low in cost. This is particularly due to the fact that the invention requires few additional sensors.

Also noted is a significant reduction in the mass of the airplane, on the order of 7 kg compared to certain prior art solutions requiring armored cables connecting the sensors located at the secondary high clip to the airplane's calculator.

In addition, given the simplicity of the equipment needed, the invention is able to detect faults under difficult outside conditions (low temperatures . . . ).

Figure 4:
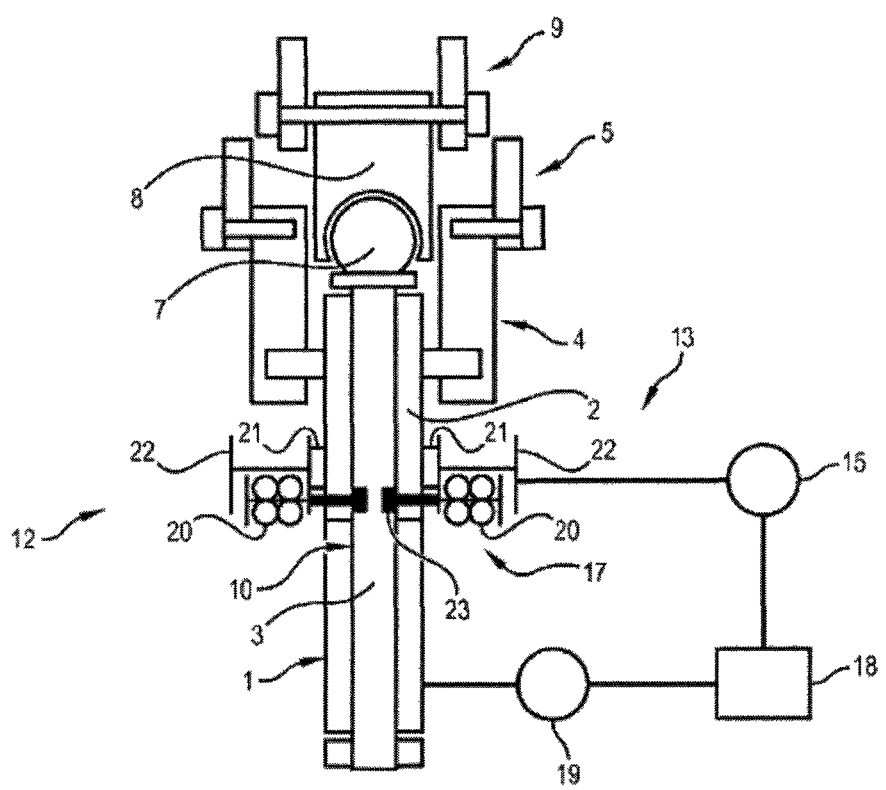
FIG. 4 is a schematic representation of an embodiment of a flight control actuator according to the invention.

A particular embodiment of the device 13 and of the flight control actuator 12 according to the invention is shown in FIG. 4.

In this embodiment, the disconnection system 17 includes a breakable pin 23. Said breakable pin 23 has a cross-section calibrated so as to break at a predetermined load, corresponding to a mechanical load exerted by the rod 3 on the screw 2 upon a break in the primary load path 1 (breakage of the screw or of another element of the primary load path 1).

Indeed, according to the invention, the disconnection system 17 disconnects the screw 2 from the sensor 15 in the event of relative movement of the rod 3 with respect to the screw 2 upon a break in the primary load path 1. As previously stated, this displacement brings about a mechanical load exerted by the rod 3 on the screw 2, which makes it possible to have information regarding the relative movement of the rod 3 with respect to the screw 2.

Below the load exerted by the rod 3 on the screw 2 upon a break of the primary load path 1, said breakable pin 23 is calibrated not to break in order to avoid spurious detection. This load threshold is known from simulation and/or in situ measurements.

The pin 23 can be placed in a slot running through the screw 2 and the rod 3, or be screwed into a recess grooved for this purpose.

In addition, the axis of said breakable pin 23 is subjected to a predetermined extraction load, allowing extraction of the pin 23 from the screw 2 in the event of breakage of said pin 23. Said extraction load is exerted by pins 20, at right angles to the screw 2.

The pin 23 connects the screw 2 to a pinion 22 which, via a gear train, drives the position sensor 15, for example an angular position sensor driven in rotation.

Figure 5:
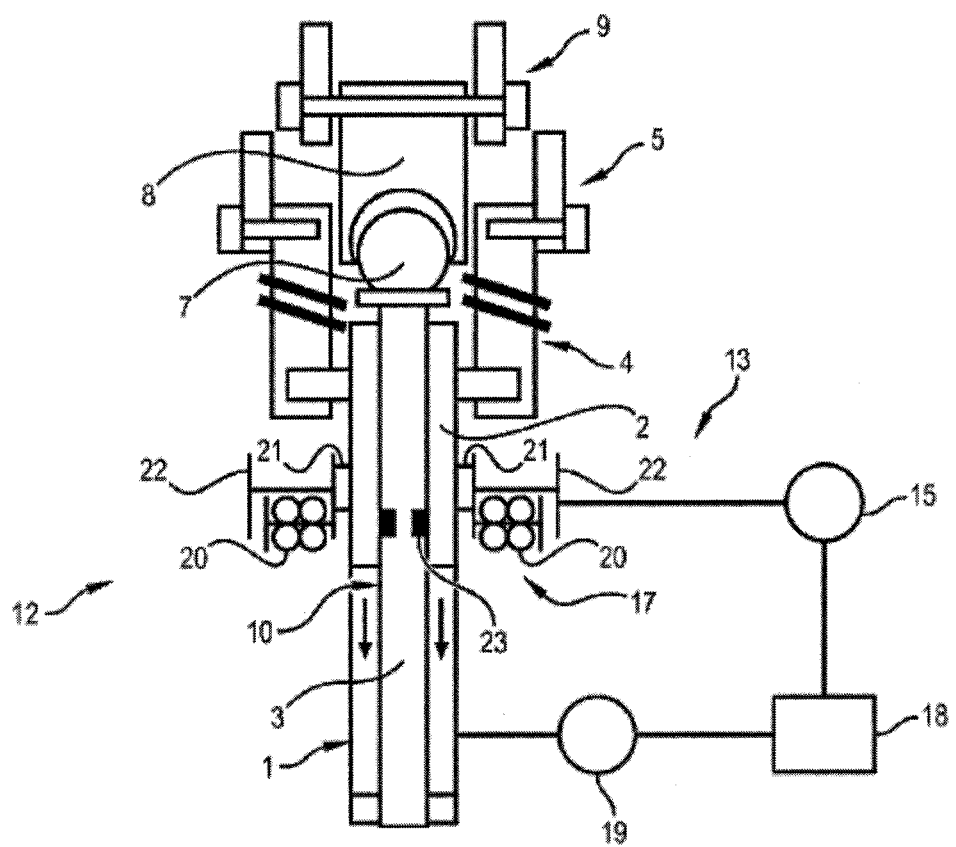
FIG. 5 is a schematic representation of an embodiment of a detection device and of a flight control actuator according to the invention, in the event of a break of the primary load path.

In the event of a break in the primary load path 1, and as illustrated in FIG. 5, the rod 3 exerts a mechanical load above the breakage threshold of the pin 23, which causes the pin 23 to break. Due to the spring load exerted on the pin 23, it disengages from the screw 3. In disengaging, the pinion 22 becomes free to rotate, thanks in particular to a bearing 21.

The pinion 22 therefore no longer follows the rotation of the screw 2, which means that the sensor 15 no longer measures information representing the angular position of the screw 2, and is disconnected from said screw 2, which allows detection of a break in the primary load path 1.

When the calculator 8 compares the signal measured by the position sensor 15 with the signal measured by the second position sensor 19, it detects a fault when the comparison is greater (or less, as the case may be) than a predetermined threshold.

Other disconnection systems 17 can be produced.

The invention applies to any flight control actuator having a primary load path and a secondary load path capable of taking over a load in the event of a break of the primary load path as previously described.

The invention offers numerous advantages in terms of cost, of simplicity, of reliability and of integration.

The invention claimed is:

1. A device (13) for detecting breakage of a primary load path in a flight control actuator, said actuator having a primary load path (1) comprising a hollow rotary screw (2), a secondary load path (10) comprising a load-assuming safety rod (3) passing through the screw (2), said device (13) being characterized in that it includes a position sensor (15), connected to the screw (2) for measuring information representing its angular position, and a disconnection system (17), capable of disconnecting the position sensor (15) from the screw (2) in the event of relative displacement of the rod (3) with respect to the screw (2) upon a break of the primary load path (1).

2. The device according to claim 1, additionally including a calculator (18) configured to compare the information measured by the position sensor (15), and information representing the angular position of the screw (2) measured by a second position sensor (19) independent of the disconnection system (17).

3. The device according to claim 2, wherein the calculator (18) is configured to a break in the primary load path (1) when the comparison is greater or less than a predetermined threshold.

4. The device according to one of claims 1 through 3, wherein the disconnection system (17) is capable of disconnecting the position sensor (15) from the screw (2) when the rod (3) exerts a predetermined load on the screw (2), corresponding to a mechanical load exerted by the rod (3) on the screw (2) upon breakage of the screw (2) or of another element of the primary load path (1).

5. The device according to one of claims 1 through 4, wherein the disconnection system (17) includes a breakable pin (23).

6. The device according to claim 5, wherein the breakable pin (23) has a cross-section calibrated to break at a predetermined load, corresponding to a mechanical load exerted by the rod (3) on the screw (2) upon breakage of the primary load path (1).

7. The device according to one of claim 5 or 6, wherein the breakable pin (23) is subjected to a predetermined extraction load, allowing extraction of the pin (23) from the screw (2) in the event of breakage of said pin (23).

8. A flight control actuator (12) including a primary load path (1) comprising a hollow rotary screw (2),
a secondary load path (10) comprising a load-assuming safety rod (3) passing through the screw (2), the secondary load path (10) being capable of taking over the loads exerted on the primary load path (1) in the event of a break in the primary load path (1), said actuator (12) being characterized in that it includes a device (13) for detecting breakage of the primary load path according to one of claim 7.

9. The device according to one of claims 1 through 7, wherein the position sensor (15) is an angular position sensor (15).

* * * * *

UNITED STATES PATENT AND TRADEMARK OFFICE
CERTIFICATE OF CORRECTION

| | | Page 1 of 1 |
|---|---|---|
| PATENT NO. | : 8,944,372 B2 | |
| APPLICATION NO. | : 13/695279 | |
| DATED | : February 3, 2015 | |
| INVENTOR(S) | : Thomas Moulon and Raphael Medina | |

It is certified that error appears in the above-identified patent and that said Letters Patent is hereby corrected as shown below:

In the Claims,

Column 8, Claim 8, line 53, please delete "one of".

Signed and Sealed this
Twenty-ninth Day of September, 2015

Michelle K. Lee
*Director of the United States Patent and Trademark Office*